(12) United States Patent
Whaley et al.

(10) Patent No.: US 10,445,009 B2
(45) Date of Patent: Oct. 15, 2019

(54) SYSTEMS AND METHODS OF CONTROLLING MEMORY FOOTPRINT

(71) Applicant: Intel Corporation, Santa Clara, CA (US)

(72) Inventors: Graham Whaley, Leeds (GB); Adriaan van de Ven, Portland, OR (US); Manohar R. Castelino, Santa Clara, CA (US); Jose C. Venegas Munoz, Guadalajara (MX); Samuel Ortiz, Teyran (FR)

(73) Assignee: INTEL CORPORATION, Santa Clara, CA (US)

( * ) Notice: Subject to any disclaimer, the term of this patent is extended or adjusted under 35 U.S.C. 154(b) by 146 days.

(21) Appl. No.: 15/639,471

(22) Filed: Jun. 30, 2017

(65) Prior Publication Data

US 2019/0004720 A1  Jan. 3, 2019

(51) Int. Cl.
*G06F 9/455* (2018.01)
*G06F 3/06* (2006.01)

(52) U.S. Cl.
CPC .......... *G06F 3/0631* (2013.01); *G06F 3/0604* (2013.01); *G06F 3/0644* (2013.01); *G06F 3/0665* (2013.01); *G06F 3/0673* (2013.01); *G06F 9/45558* (2013.01); *G06F 2009/45583* (2013.01)

(58) Field of Classification Search
CPC .... G06F 3/0631; G06F 3/0604; G06F 3/0665; G06F 9/45558; G06F 3/0673; G06F 3/0644; G06F 2009/45583
See application file for complete search history.

(56) References Cited

U.S. PATENT DOCUMENTS 8,015,367 B1 * 9/2011 Rao .................. G06F 12/109
                                                  711/147
9,442,752 B1 * 9/2016 Roth .................. G06F 9/45558
(Continued)

OTHER PUBLICATIONS

"FreeBSD Now Has NUMA? Why'd It Take So Long?", Jul. 15, 2015, 2 pages, <URL: https://forums.freebsd.org/threads/52368/>.
(Continued)

*Primary Examiner* — Adam Lee
(74) *Attorney, Agent, or Firm* — Finch & Maloney PLLC (57) ABSTRACT

Systems and methods that manage memory usage by a virtual machine are provided. These systems and methods compact the virtual machine's memory footprint, thereby promoting efficient use of memory and gaining performance benefits of increased data locality. In some embodiments, a guest operating system running within the virtual machine is enhanced to allocate its VM memory in a compact manner. The guest operating system includes a memory manager that is configured to reference an artificial access cost when identifying memory areas to allocate for use by applications. These access costs are described as being artificial because they are not representative of actual, hardware based access costs, but instead are fictitious costs that increase as the addresses of the memory areas increase. Because of these increasing artificial access costs, the memory manager identifies memory areas with lower addresses for allocation and use prior to memory areas with higher addresses.

21 Claims, 7 Drawing Sheets

(56) References Cited

U.S. PATENT DOCUMENTS

| | | | | |
|---|---|---|---|---|
| 2009/0138880 A1* | 5/2009 | Yafimau | G06F 9/461 | 718/103 |
| 2009/0144510 A1* | 6/2009 | Wibling | G06F 9/5016 | 711/147 |
| 2009/0287902 A1* | 11/2009 | Fullerton | G06F 12/1036 | 711/206 |
| 2010/0070678 A1* | 3/2010 | Zhang | G06F 9/461 | 711/6 |
| 2010/0161879 A1* | 6/2010 | Nation | G06F 12/0813 | 711/103 |
| 2010/0274947 A1* | 10/2010 | Ohta | G06F 9/45558 | 711/6 |
| 2012/0215582 A1* | 8/2012 | Petri | G06Q 10/06 | 705/7.27 |
| 2013/0047157 A1* | 2/2013 | Suzuki | G06F 9/45533 | 718/1 |
| 2014/0047251 A1* | 2/2014 | Kottilingal | G06F 1/3296 | 713/320 |
| 2014/0196033 A1* | 7/2014 | Bobroff | G06F 9/45558 | 718/1 |
| 2014/0282501 A1* | 9/2014 | Zeng | G06F 9/45545 | 718/1 |
| 2014/0298330 A1* | 10/2014 | Suzuki | G06F 9/45533 | 718/1 |
| 2014/0344807 A1* | 11/2014 | Bursell | G06F 9/45558 | 718/1 |
| 2014/0344811 A1* | 11/2014 | Suzuki | G06F 9/54 | 718/1 |
| 2014/0379955 A1* | 12/2014 | Dong | G06F 11/1484 | 711/6 |
| 2015/0082305 A1* | 3/2015 | Hepkin | G06F 21/53 | 718/1 |
| 2015/0127834 A1* | 5/2015 | Udupi | G06F 9/5044 | 709/226 |
| 2015/0169337 A1* | 6/2015 | Abali | G06F 9/5088 | 718/1 |
| 2015/0293790 A1* | 10/2015 | Kim | G06F 9/5016 | 718/1 |
| 2015/0319160 A1* | 11/2015 | Ferguson | H04L 9/0894 | 726/10 |
| 2016/0112281 A1* | 4/2016 | Mason | H04L 41/5051 | 705/39 |
| 2016/0179185 A1* | 6/2016 | Eide | G06F 1/28 | 713/320 |
| 2016/0203433 A1* | 7/2016 | Chen | G06Q 10/06311 | 705/7.14 |
| 2016/0212064 A1* | 7/2016 | Biswas | H04L 47/781 | |
| 2016/0357602 A1* | 12/2016 | Sakai | G06F 9/4856 | |
| 2016/0378554 A1* | 12/2016 | Gummaraju | G06F 9/5011 | 718/104 |
| 2017/0004182 A1* | 1/2017 | Simpson | G06F 17/30554 | |
| 2017/0371636 A1* | 12/2017 | Palavalli | G06F 9/5077 | |
| 2018/0018098 A1* | 1/2018 | Burugula | G06F 3/0605 | |
| 2018/0107605 A1* | 4/2018 | Dong | G06F 12/16 | |
| 2018/0150251 A1* | 5/2018 | Parker | G06F 12/1009 | |
| 2018/0181439 A1* | 6/2018 | Jackson | G06F 9/5016 | |
| 2018/0246818 A1* | 8/2018 | Tsirkin | G06F 12/1408 | |
| 2018/0341529 A1* | 11/2018 | Kou | G06F 9/5077 | |

OTHER PUBLICATIONS

"Cache and Memory Affinity Optimizations", IBM Knowledge Center, identified on May 8, 2017, 2 pages, <https://www.ibm.com/support/knowledgementcenter/en/ssw_aix_72/com.ibm.aix.optimiza/dso>.

Johan De Gelas, "Hardware Virtualization: the Nuts and Bolts", AnandTech, Mar. 17, 2008, 5 pages.

"Index: kernel/git/torvalds/linux.git", Linus Torvalds, <URL: https://git.kernel.org/pub/scm/linux/kernel/git/torvalds/linux.git/tree/Documentation/vm/>, identified on May 8, 2017, 3 pages.

"Index: kernel/git/torvalds/linux.git", Linus Torvalds, <URL: https://git.kernel.org/pub/scm/linux/kernel/git/torvalds/linux.git/tree/Documentation/x86/>, identified on May 8, 2017, 5 pages.

"Index: kernel/git/torvalds/linux.git", Linus Torvalds, <URL: https://git.kernel.org/pub/scm/linux/kernel/git/torvalds/linux.git/tree/Documentation/x86/>, identified on May 8, 2017, 2 pages.

"Index: kernel/git/torvalds/linux.git", Linus Torvalds, <URL: https://git.kernel.org/pub/scm/linux/kernel/git/torvalds/linux.git/tree/Copying>, identified on May 8, 2017, 6 pages.

"Index: kernel/git/torvalds/linux.git", Linus Torvalds, <URL: https://git.kernel.org/pub/scm/linux/kernel/git/torvalds/linux.git/tree/Documentation/RCU>, identified on May 8, 2017, 2 pages.

NUMA Support, Microsoft, identified on May 8, 2017, 4 pages, <https://msdn.microsoft.com/en-us/library/windows/desktop/aa363804(v=vs.85).aspx>.

"Memory and Thread Placement Optimization Developers Guide", Chapter 1 Overview of Locality Groups, identified on May 8, 2017, 2 pages, <https://docs.oracle.com/cd/E19120-01/open.solaris/820-1691/6ndbijb6a/index.html>.

"Second Level Address Translation", Wikipedia, identified on May 8, 2017, 5 pages, <https://en.wikipedia.org/wiki/Second_Level_Address_Translation>.

* cited by examiner

SYSTEMS AND METHODS OF CONTROLLING MEMORY FOOTPRINT

BACKGROUND

Conventional techniques for mapping host system memory into virtual machines span a range that runs from simple, one-time actions to complex, dynamic interactions between a host operating system and one or more virtual machines implemented by the host operating system. These conventional techniques include "ballooning," "hotplugging," and fixed size configuration. According to ballooning and hotplugging, the host operating system maps physical memory to a virtual machine and dynamically requests that the virtual machine return at least a portion of the mapped memory when needed. Both ballooning and hotplugging require complex and dynamic interactions between the host operating system and a guest operating system executed by the virtual machine. Ballooning additionally requires that the guest operating system include processes configured to execute specialized ballooning logic. Hotplugging requires interactions between the host operating system and the guest operating system to determine when additional memory should be added. This additional memory is conventionally added in large chunks having coarse granularity (e.g., precise to gigabytes or larger units). Moreover, once this additional memory is added, it is difficult to free if the guest operating system's memory usage decreases. According to fixed size configuration, a virtual machine specifies before its creation what its memory requirements are, or a host operating system estimates the virtual machine's memory requirements and maps enough physical memory to meet those requirements. Over-allocation issues are common to fixed sized configuration in which too much memory is allocated to the virtual machine. However, to prevent over allocation, applications to be executed by the virtual machine must pre-register their requirements, which is sometimes infeasible. In addition, conventional host operating system estimates for fixed sized configuration are consistently too small for at least some use cases. Thus, these conventional techniques present potential problems for balancing a whole system because the host operating system has little information or control regarding how one or more guest operating systems implemented by a virtual machine utilize the mapped memory. Thus, using these conventional techniques, physical memory mapped to a virtual machine may be sparsely utilized.

DETAILED DESCRIPTION

The systems and methods disclosed herein manage memory usage by a virtual machine to compact its memory footprint, thereby promoting efficient use of memory and gaining the performance benefits of increased data locality. More particularly, in some embodiments, a guest operating system running within the virtual machine is enhanced to allocate its VM memory in a compact manner. In some of these embodiments, the guest operating system includes a memory manager that is configured to reference an artificial access cost when identifying memory areas to allocate for use by applications. These access costs are described as being artificial because they are not representative of actual, hardware based access costs, but instead are fictitious costs that can be varied to influence memory allocation processes. In some embodiments, these artificial access costs increase as the addresses of the memory areas associated with the artificial access costs increase. Because of these increasing artificial access costs, the memory manager identifies memory areas with lower addresses for allocation and use prior to memory areas with higher addresses. In other embodiments, these artificial access costs decrease as the addresses of the memory areas associated with the artificial access costs increases. In still other embodiments, these artificial access costs vary in some other relationship to the addresses of the memory areas associated with the artificial access costs—but in a manner designed to influence memory allocation processes in a manner that compacts the footprint of the virtual machine.

In some embodiments, the memory areas associated with artificial access costs take the form of memory slices that are partitioned from the VM memory by the memory manager during initialization of the virtual machine. A memory slice is a contiguous area of VM memory that is individually identifiable and that spans a predefined amount of memory. In some embodiments, the memory manager is configured to read configuration information stored within a memory slice map that defines attributes of the memory slices (e.g. size, ordering within the VM memory, artificial access cost, etc.). In these embodiments, the memory manager is configured to use this configuration information to partition the memory slices. Further, in these embodiments, the memory manager is configured to maintain bookkeeping information regarding partitioned memory slices (e.g., starting address, ending address, offset, size, etc.) within the memory slice map.

In some embodiments, the memory manager is configured to access the memory slice map during processing of requests to allocate memory for use by applications. In these embodiments, in response to receiving a memory allocation request, the memory manager identifies one or more memory slices with sufficient space available to satisfy the request, if sufficient space is available. In some embodiments, the one or more memory slices are identified using a process that favors lower cost memory slices over higher cost memory slices. After identifying one or more memory slices including sufficient space, the memory manager allocates the sufficient space and responds to the originator of the memory allocation request with an identifier (e.g., an address) of the allocated space. In this way, some embodiments compact the memory footprint of the guest operating system and the applications executing under its support.

In some embodiments, the memory manager resourcefully utilizes components found in existing operating systems to implement artificial access costs. For example, in one embodiment, the memory manager improves upon a Linux Kernel Non-Uniform Memory Architecture (NUMA) subsystem. Conventional Linux NUMA subsystems are configured to address physical architectures that support multiple, distinct nodes. Each node may include a processor and memory local to the processor. Linux NUMA subsystems include processes that cause processors within a node to utilize local memory within the node, when possible. Where local memory is not able to be utilized by a processor, Linux NUMA subsystems cause processors to utilize memory in other nodes physically close to the processor, thereby optimizing performance.

In embodiments in which the memory manager improves upon a Linux NUMA subsystem, the memory manager enhances NUMA nodes to generate memory slices that are parts of the physical memory of a computing device. These memory slices may be sized, for example, to meet the requirements of memory allocation requests received by the memory manager. In these embodiments, the memory manager configures the Linux NUMA subsystem to overlay a "fake" ordered memory hierarchy upon the underlying physical memory. In this "fake" ordered memory hierarchy, "fake" nodes are adapted into memory slices by associating the nodes with increasing artificial access costs. During subsequent memory allocations, the memory manager will prefer memory slices with lower costs, thereby compacting the memory footprint of the virtual machine executing the memory manager.

It is appreciated that in embodiments where the memory manager is an improvement upon the Linux NUMA subsystem, the memory manager will optimize memory slice usage over time. For example, if space within lower cost memory slices become available as a result of application execution, the memory manager may automatically migrate pages in higher cost memory slices to pages in lower cost memory slices. These actions further contribute to compacting the memory footprint of a virtual machine.

In other embodiments, the memory manager may be implemented as an improvement to other existing subsystems. For instance, in embodiments where the guest operating system is Solaris, the memory manager may be implemented as an improvement to locality groups and Memory Placement Optimization. In embodiments where the guest operating system is FreeBSD, the memory manager may be implemented as an improvement to memory domains. In embodiments where the guest operating system is AIX, the memory manager may be implemented as an improvement to the scheduler resource affinity domain. In embodiments where the guest operating system is Windows, the memory manager may be implemented as an improvement to Windows NUMA.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

As explained above, conventional techniques for mapping host system memory into virtual machines result in sparse utilization of memory. In implementing a virtual machine, a host operating system typically allocates physical memory that backs a VM memory address when the VM memory address is used. However, conventional guest operating systems use VM memory addresses that are sparsely distributed within the VM memory. This sparse distribution of VM memory addresses, in turn, causes the memory footprint of the virtual machine to be sparsely distributed within the physical memory. Better page sharing and allocation efficiencies should be obtainable if a virtual machine only utilizes VM memory addresses within the footprint of its requirements.

Thus, and in accordance with at least some embodiments disclosed herein, a computing device implements a guest operating system within a virtual machine that attaches a cost-by-address to the VM memory inside the virtual machine, guiding the virtual machine to prefer utilization of memory within particular regions (e.g., lower regions) in its address space. As expressed, this preference increases the locality of the virtual machine memory usage, and improves memory allocation, which enables sharing and management potential across one or more virtual machines implemented by the computing device.

Figure 1:
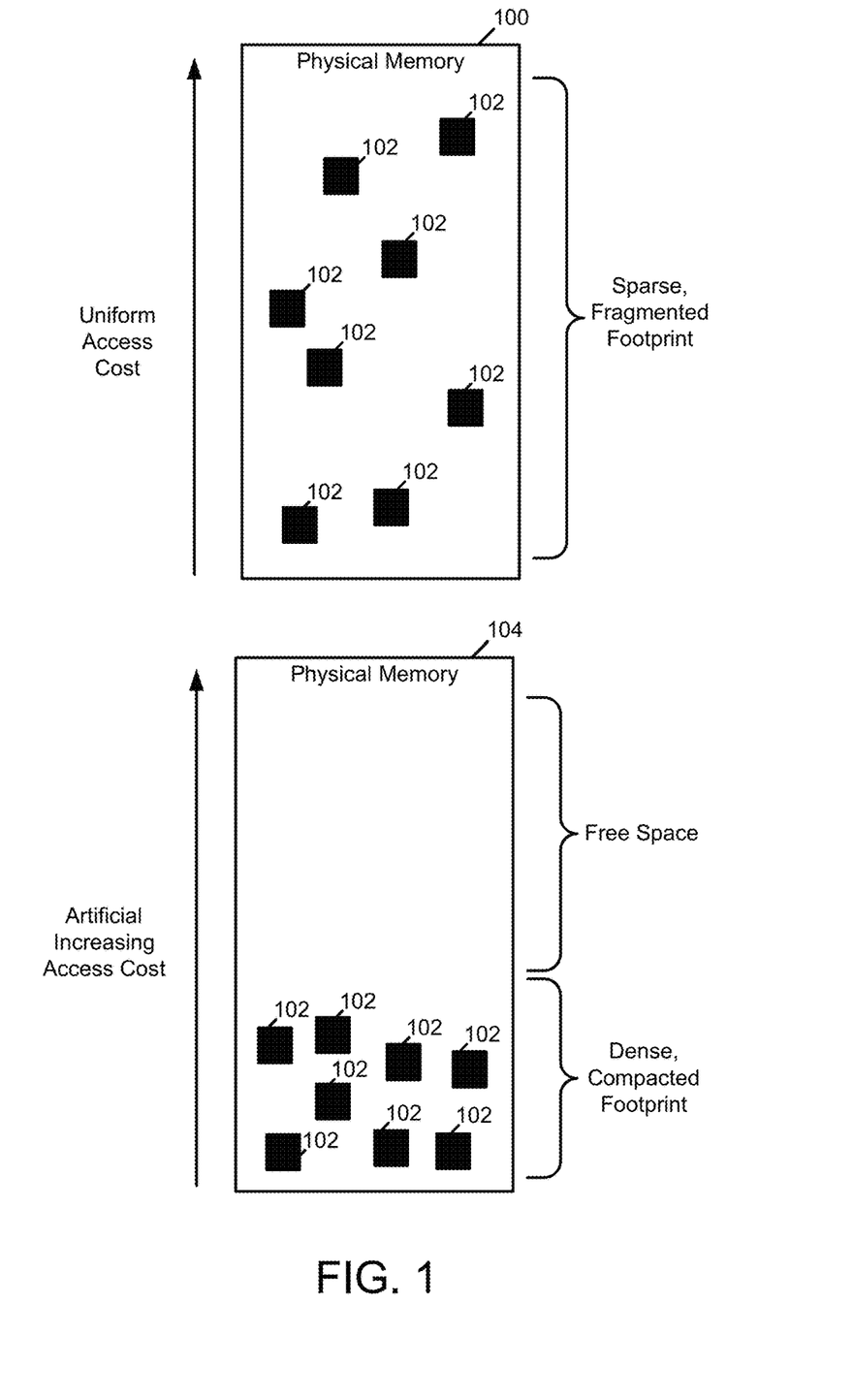
FIG. 1 is a block diagram illustrating memory block usage in accordance with an embodiment of the present disclosure.

FIG. 1 illustrates a memory 100 that is sparsely utilized and memory 104 that is densely utilized. As shown in FIG. 1, the memory 100 has a uniform access cost (e.g., access cost of 0). The memory 100 includes used blocks 102 that are distributed throughout its address space. As also shown in FIG. 1, the memory 104 has an artificial access cost that increases along with the address of the memory. The memory 104 includes used blocks 102 that are distributed within the lower areas of its address space, leaving substantial, contiguous memory space free and available for other use.

Additional advantages of the techniques described herein include no need for pre-creation memory requirement estimation and no need for dynamic host operating system intervention or interaction with guest operating systems executed by the virtual machine because the entirety of the physical memory can be allocated to the virtual machine without the physical memory being sparsely utilized. This is so because the virtual machine self-relegates its memory usage to a compacted footprint of utilized memory addresses. Furthermore, it is appreciated that the embodiments disclosed herein reduce the amount of upper memory space with physical pages mapped. As page mapping is handled in a tree hierarchy, even a single physical page mapped in a higher address space of the VM memory would cause the portion of the mapping tree that covers the address of that page to be populated to some extent. This population comes with a cost as it requires page table allocations. By keeping the memory footprint compacted and leaving more linear space unused, and thus unallocated, the embodiment disclosed herein require less page table mappings than conventional system, and thus provide overall system efficiencies.

System Architecture

Figure 2:
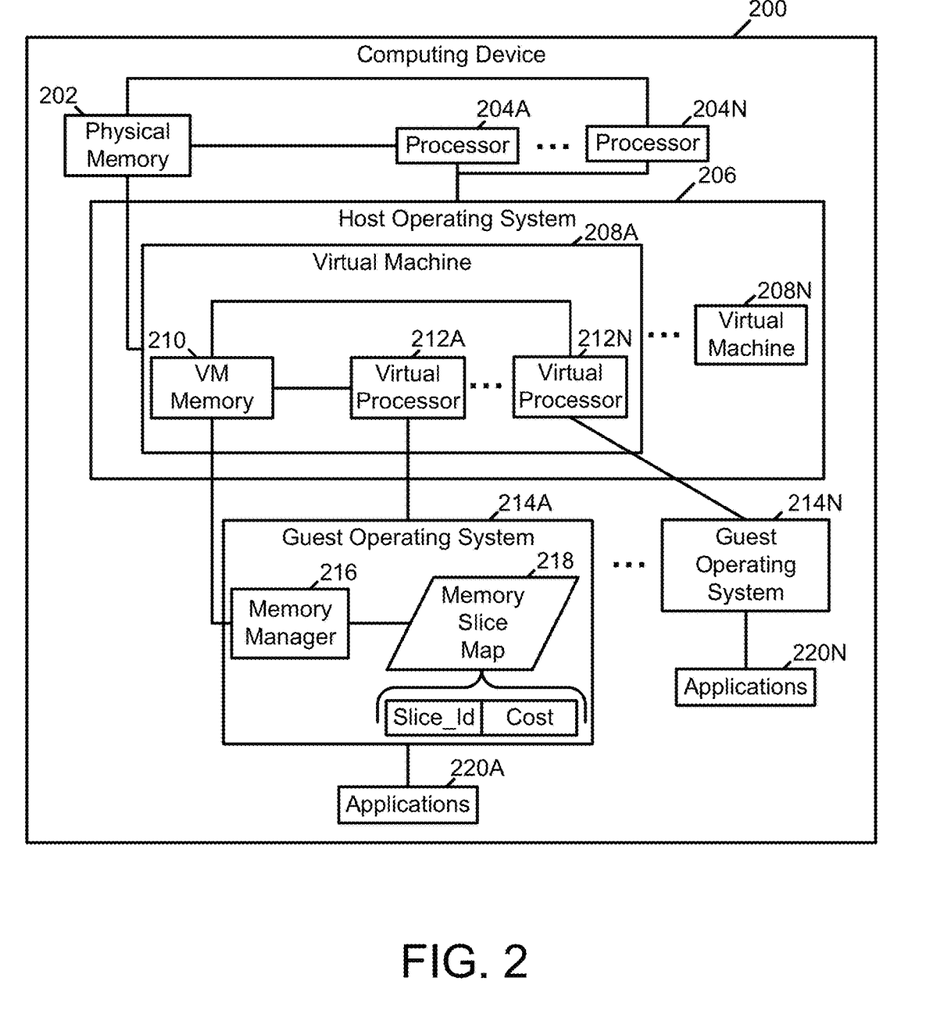
FIG. 2 is a block diagram illustrating a computing device configured in accordance with an embodiment of the present disclosure.

FIG. 2 illustrates a computing device 200 including physical memory 202 and one or more processors 204A through 204N. As shown in FIG. 2, the one or more processors 204A through 204N implement a host operating system 206. The host operating system 206 implements one or more virtual machines 208A through 208N. Each of the virtual machines 208A through 208N includes virtual machine (VM) memory 210 and one or more virtual processors 212A through 212N. The one or more virtual processors 212A through 212N implement one or more guest operating systems 214A through 214N. Each of the guest operating systems 214A supports the execution of one or more applications 220A through 220N. Moreover, each of the guest operating systems 214A through 214N includes a memory manager 216 and a memory slice map 218.

As illustrated in FIG. 2, the physical memory 202 may incorporate volatile and/or non-volatile data storage (e.g., read-only memory, random access memory, flash memory, magnetic/optical disk, and/or some other computer readable and writable medium) that is readable and/or writable by the one or more processors 204A through 204N. The physical memory 202 is sized and configured to store programs executable by the one or more processors 204A through 204N and at least some of the data used by the programs during execution. Each of the one or more processors 204A through 204N includes various computing circuitry, such as an arithmetic-logic unit and register memory, that can execute instructions defined by an instruction set supported by the processor. Each of the one or more processors 204A through 204N may include a single core processor, a multi-core processor, a micro-controller, or some other data processing device. Additional aspects and components of the computing hardware included in the computing device 200 are described further below with reference to FIGS. 6 and 7.

In some embodiments, the host operating system 206 abstracts and controls the computing hardware of the computing device 200 to support execution of programs such as the one or more virtual machines 208A through 208N. For example, the host operating system 206 may include a hypervisor configured to implement the one or more virtual machines 208A through 208N. As shown in FIG. 2, the host operating system 206 maps some or all of the physical memory 202 to the VM memory 210 for use by the virtual machine 208A. The virtual processors 212A through 212N utilize the VM memory to implement the one or more guest operating systems 214A through 214N. These guest operating systems may include a variety of operating systems such as Linux, Solaris, Windows, AIX, and FreeBSD.

As shown in FIG. 2, each of the guest operating systems 214A through 214N includes a memory manager 216 that is configured to manage the memory footprint of the guest operating system and the applications it supports within the VM memory 210. When executing according to this configuration, the memory manager 216 partitions the VM memory 210 into a plurality of memory slices and maintains bookkeeping information regarding these memory slices in the memory slice map 218. In some embodiments, the memory slice map 218 is a cross reference that associates memory slice identifiers with data descriptive of the memory slices, such as artificial costs to access the memory slices. In some embodiments illustrated by FIG. 2, the memory slice map 218 includes a slice_id field that is sized and typed to store an identifier of a memory slice and a cost field that is sized and typed to store information descriptive of an artificial cost to access the memory slice. In some embodiments, both the slice_id field and the cost field are unsigned integers.

In some embodiments, the bookkeeping information includes an identifier (e.g., an address) of each memory slice. In other embodiments, the bookkeeping information includes a size and/or offset of the memory slice. In some embodiments, the memory manager 216 partitions each of the memory slices with a uniform size (e.g., 1 megabyte (MB)). In other embodiments, the memory manager 216 partitions the memory slices according to a binary incrementing pattern (e.g., 1 MB, 2 MB, 4 MB, 8 MB, 16 MB, etc.). However, the embodiments disclosed herein are not limited to a particular pattern or size of memory slices.

In some embodiments, the memory manager 216 is configured to process memory allocation requests that originate from the one or more applications 220A through 220N. When executing according to these configurations in some embodiments, the memory manager 216 receives the memory allocation requests, identifies one or more memory slices with sufficient space available to satisfy the request, allocates the space within the identified memory slice(s), and responds to the memory allocation request with an identifier (e.g., address and/or offset) of the allocated space. The one or more identified memory slices may be, for example, one or more low-cost memory slices, as described below. Examples of processes that the memory manager 216 executes in various embodiments are described further below with reference to FIGS. 3-4.

Methodology

Figure 3:
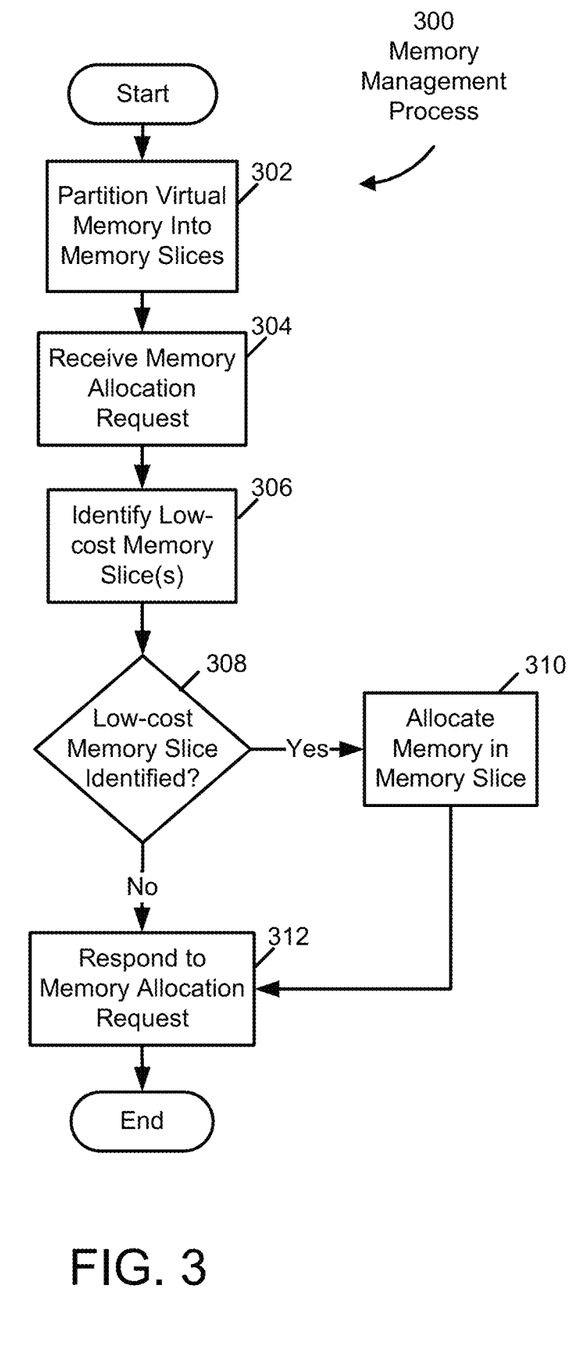
FIG. 3 is a flow diagram illustrating a memory management process in accordance with an embodiment of the present disclosure.

Some embodiments disclosed herein execute a memory management process, such as the memory management process 300 illustrated in FIG. 3. The memory management process 300 may be executed by a computing device, such as the computing device 200 described above with reference to FIG. 2. The acts executed by the memory management process 300 collectively control and increase the density of the memory footprint of a virtual machine, such as any of the one or more virtual machines 208A through 208N, and any programs executed by the virtual machine, such as any of the guest operating systems 214A through 214N and any of the applications 220A through 220N.

As illustrated in FIG. 3, the memory management process 300 starts in act 302 with a memory manager (e.g., the memory manager 216) partitioning a VM memory (e.g., the VM memory 210) into memory slices. In some embodiments, the memory manager reads configuration information descriptive of the set of memory slices to be created and partitions the VM memory as specified within this configuration information. This configuration information may specify characteristics of each memory slice such as size, cost, etc. For instance, the configuration information may specify a particular and different size for each memory slice or may specify a common size for all memory slices. Additionally, the configuration information may specify a cost that increases with a memory address of each memory slice, decreases with a memory address of each memory slice, or that varies in some other relationship with a memory address of each memory slice. For instance, in at least one embodiment, the configuration information specifies a cost that increases within each memory slice, but that resets to some default value at the beginning memory address of each memory slice, thereby creating memory pools with similar cost profiles within each memory slice.

In some embodiments, this configuration information is stored within a memory slice map (e.g., the memory slice map 218). As the memory manager creates the memory slices, it may update field values within the memory slice map to record bookkeeping information (e.g., beginning and ending addresses and/or offset and length, etc.) of the memory slices for subsequent processing. In other embodiments, the configuration information descriptive of the set of memory slices is generated by a cost map generation process that associates artificial access costs to areas of memory. The cost map generation process may reference the current state of the VM memory when associating artificial access costs to particular memory portions to further increase the locality of data stored in the VM memory and decrease the footprint of the virtual machine.

Figure 4:
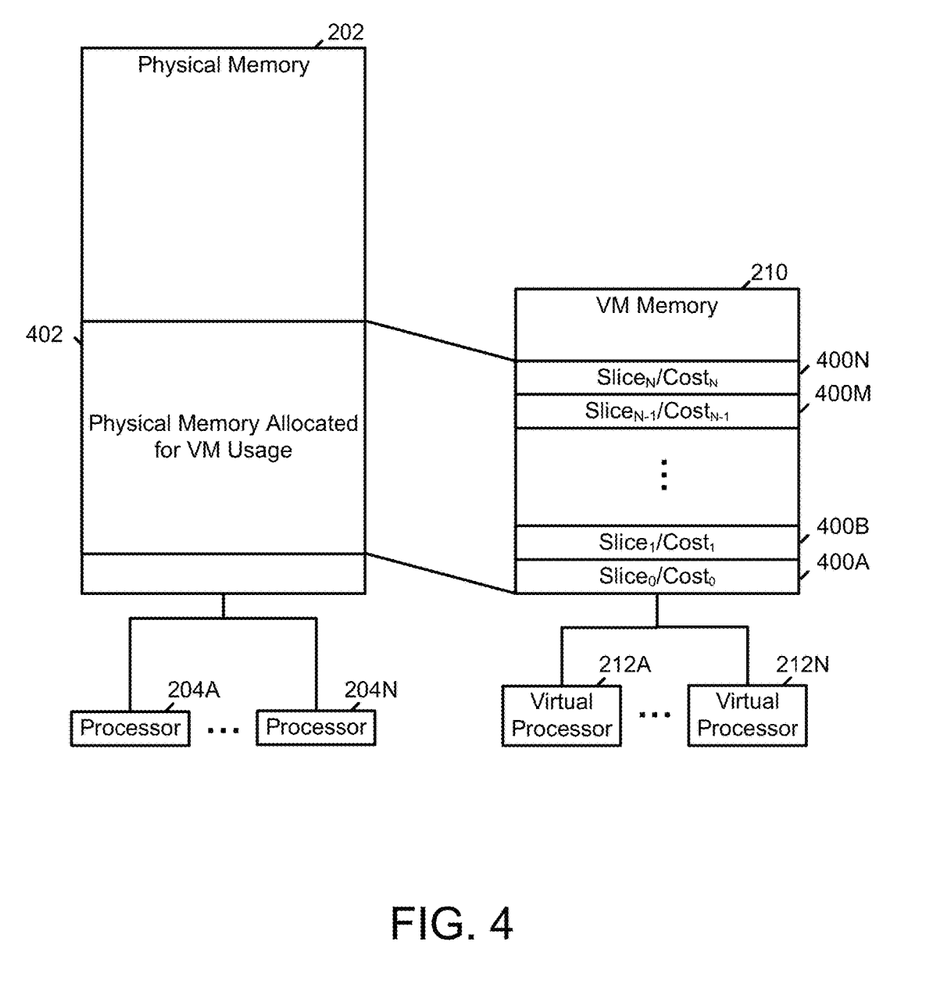
FIG. 4 is a schematic illustrating virtual machine (VM) memory configured in accordance with an embodiment of the present disclosure.

FIG. 4 illustrates one example of the configuration of the physical memory 202 and the VM memory 210 after the memory manager has executed the act 302 in some embodiments. As shown in FIG. 4, a portion 402 of the physical memory 202 is allocated for use as the VM memory 210. Furthermore, the VM memory 210 is partitioned in to a plurality of memory slices 400A through 400N. Each of these memory slices has an associated identifier (Slice$_0$-Slice$_N$) and an associated artificial access cost (Cost$_0$-Cost$_N$) and includes available memory space that can be allocated for use by applications executed by any of the virtual processors 212A through 212N.

Returning to FIG. 3, in act 304 the memory manager receives a memory allocation request from, for example, an application (e.g., the application 220A). This memory allocation request may include one or more fields that specify an amount of memory requested.

In act 306, the memory manager identifies one or more low-cost memory slices that have enough space available to service the request. The process executed to identify the one or more low-cost memory slices may vary in complexity. In some embodiments, the memory manager attempts to identify the lowest cost memory slice with sufficient contiguous available space to fully service the request. In other embodiments, the memory manager identifies the lowest cost available space available, even where the space is not contiguous and spans multiple memory slices. In still other embodiments, the memory manager identifies one or more memory slices based on heuristics that balance cost against fragmentation. For instance, in these embodiments, the memory manager identifies no more than 2 memory slices or identifies memory slices with available space that meets or exceeds a threshold percentage of the memory requested. One example of a memory slice identification process executed within the act 306 is described further below with reference to FIG. 5.

Figure 5:
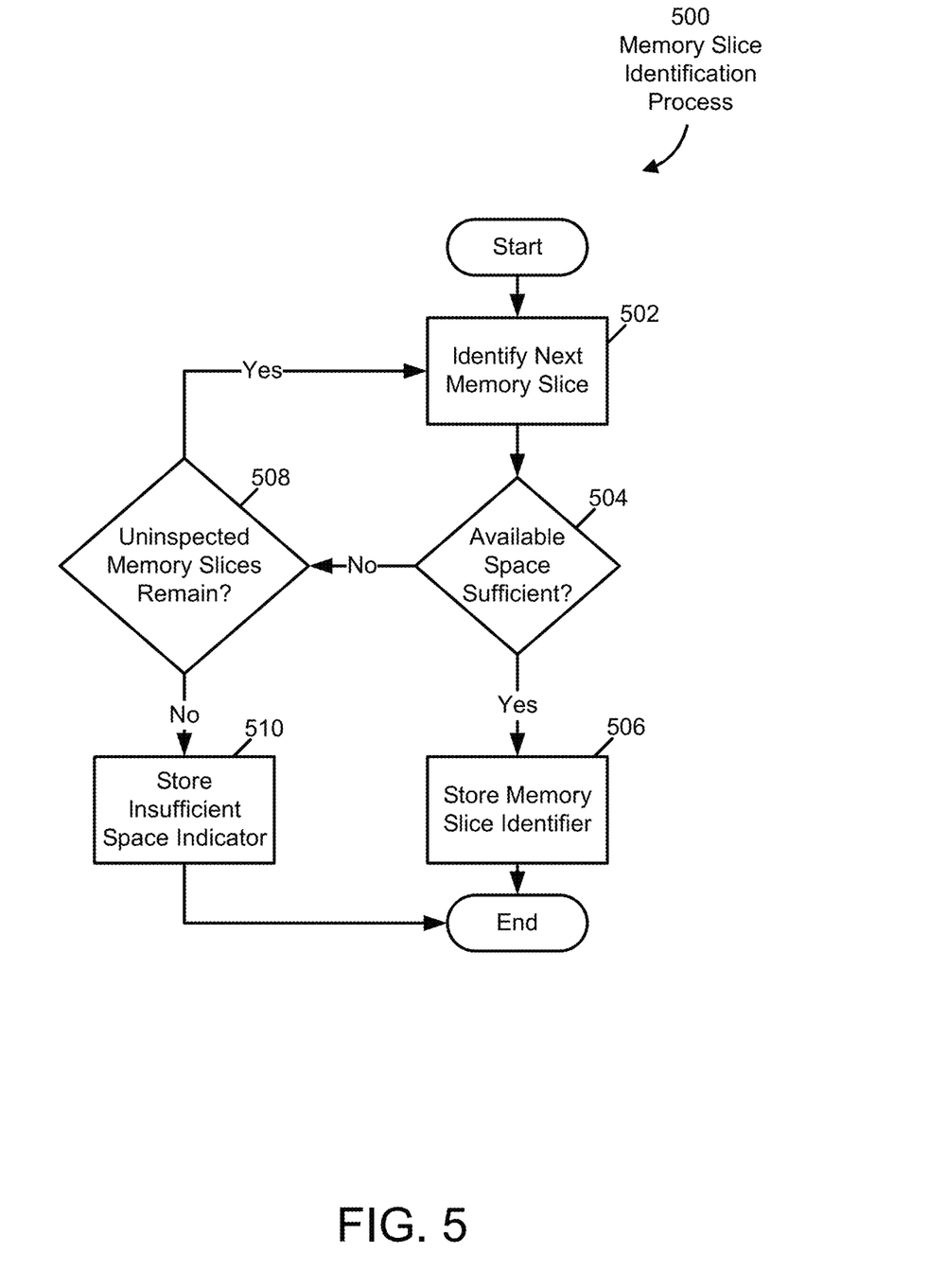
FIG. 5 is a flow chart illustrating a memory slice identification process in accordance with an embodiment of the present disclosure.

As illustrated in FIG. 5, the memory slice identification process 500 starts in act 502 with the memory manager identifying the next lowest cost memory slice of one or more memory slices (e.g., memory slice 400A from the plurality of memory slices 400A through 400N). In some embodiments, the memory manager reads an identifier of the next lowest cost memory slice from a memory slice map (e.g., the memory slice map 218). In act 504, the memory manager determines whether the identified memory slice has sufficient space available to satisfy the memory allocation request. If so, the memory manager executes act 506. Otherwise, the memory manager executes act 508.

In the act 506, the memory manager stores an identifier of the identified memory slice for subsequent processing, and the memory slice identification process 500 ends. In act 508, the memory manager determines whether uninspected memory slices remain. If so, the memory manager executes the act 502. Otherwise, the memory manager executes the act 510. In the act 510, the memory manager stores, for subsequent processing, an indicator of insufficient space available to service the request, and the memory slice identification process 500 ends.

Returning to FIG. 3, in the act 308, the memory manager determines whether one or more memory slices where identified with the act 306. If so, the memory manager executes act 310. Otherwise, the memory manager executes act 312.

In the act 310, to satisfy the memory allocation request, the memory manager allocates available space within the one or more memory slices identified with the act 306. In the act 312, the memory manager responds to the memory allocation request with an identifier of the allocated space or an indication that the memory manager was unable to satisfy the memory allocation request.

Processes 300 and 500 each depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein.

Computing Device

Figure 6:
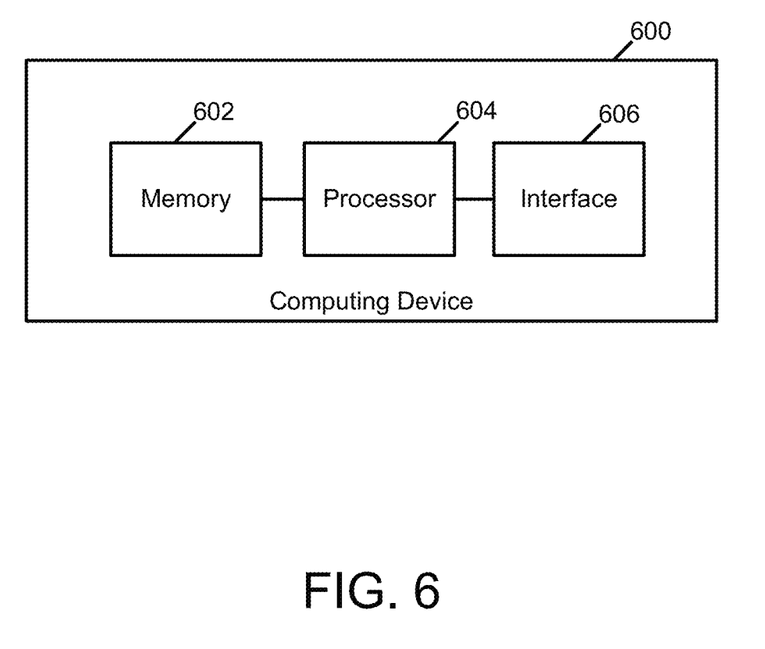
FIG. 6 is a block diagram of a computing device that may implement various methods of controlling memory footprints in accordance with an embodiment of the present disclosure.

FIG. 6 illustrates a computing device 600 that can be used to implement various components as described herein. As shown, the computing device 600 includes memory 602, at least one processor 604, and at least one interface 606. Although the particular types and models of these components may vary between computing devices, it is appreciated that each computing device includes a processor, memory, and an interface.

The interface 606 includes one or more physical interface devices such as input devices, output devices, and combination input/output devices and a software stack configured to drive operation of the devices. Interface devices may receive input or provide output. More particularly, output devices may render information for external presentation and input devices may accept or generate information from external sources. Examples of interface devices include keyboards, mouse devices, trackballs, microphones, touch screens, printing devices, display screens, speakers, network interface cards, environmental sensors, and the like. Interface devices allow programmable devices to exchange information and communicate with external entities, such as users and other systems.

The memory 602 includes volatile and/or non-volatile (i.e., non-transitory or non-transient) data storage that is readable and/or writeable by the processor 604. The memory 602 stores programs and data used or manipulated during operation of the computing device 600. The programs stored in the memory 602 are a series of instructions that are executable by the at least one processor 604. The memory 602 may include relatively high performance data storage, such as registers, caches, dynamic random access memory, and static memory. The memory 602 may further include a relatively low performance, non-volatile, computer readable and/or writable data storage medium such as flash memory or an optical or magnetic disk. Various embodiments may organize the memory 602 into particularized and, in some cases, unique structures to store data in support of the components disclosed herein. These data structures may be specifically configured to conserve storage space or increase data exchange performance and may be sized and organized to store values for particular data and types of data.

To implement and/or control specialized components in some embodiments, the processor 604 executes a series of instructions (i.e., one or more programs) that result in manipulated data. The processor 604 may be any type of processor, multiprocessor, microprocessor, or controller known in the art. The processor 604 is connected to and communicates data with the memory 602 and the interfaces 606 via an interconnection mechanism, such as a bus or some other data connection. This interconnection mechanism is represented in FIG. 6 by lines connecting the components within the computing device. In operation, the processor 604 causes data and/or encoded instructions to be read from a non-volatile data storage medium in the memory 602 and written to high performance data storage. The processor 604 manipulates the data and/or executes the encoded instructions within the high-performance data storage and copies the manipulated data to the data storage medium after processing is completed.

Although the computing device 600 is shown as an example of a computing device capable of executing the processes disclosed herein, embodiments are not limited to the computing device shown in FIG. 6. For example, various processes may be executed by one or more computing devices having a different architectures or components than those shown in FIG. 6. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a computing device as disclosed herein may be implemented in software, hardware, firmware, or any combination thereof.

For example, as described above, the processor 604 may be general purpose processor. However, when executing a specific software process as described herein (e.g., as depicted in any of FIGS. 3 and/or 5), the processor 604 becomes a special purpose processor capable of making specific logic-based determinations based on input data received, and further capable of providing one or more outputs that can be used to control or otherwise inform subsequent processing to be carried out by the processor 604 and/or other processors or circuitry with which processor 604 is communicatively coupled. The processor 604 reacts to specific input stimulus in a specific way and generates a corresponding output based on that input stimulus. In this sense, the structure of processor 604 according to one embodiment is defined by the processes shown in any of FIGS. 3 and/or 5. Moreover, in some example cases, the processor 604 proceeds through a sequence of logical transitions in which various internal register states and/or other bit cell states internal or external to the processor 604 may be set to logic high or logic low. This specific sequence of logic transitions is determined by the state of electrical input signals to the processor 604 and a special-purpose structure is effectively assumed by the processor 604 when executing each software instruction of the processes shown in FIGS. 3 and/or 5. Specifically, those instructions anticipate the various stimulus to be received and change the implicated memory states accordingly. In this way, the processor 604 may generate and store or otherwise provide useful output signals. Thus, it is appreciated that the processor 604, during execution of a software process becomes a special purpose machine, capable of processing only specific input signals and rendering specific output signals based on the one or more logic operations performed during execution of each instruction. In at least some examples, the processor 604 is configured to execute a function where software is stored in a data storage device coupled with the processor 604 (e.g., the memory 602) and that software is configured to cause the processor 604 to proceed through a sequence of various logic operations that result in the function being executed.

Figure 7:
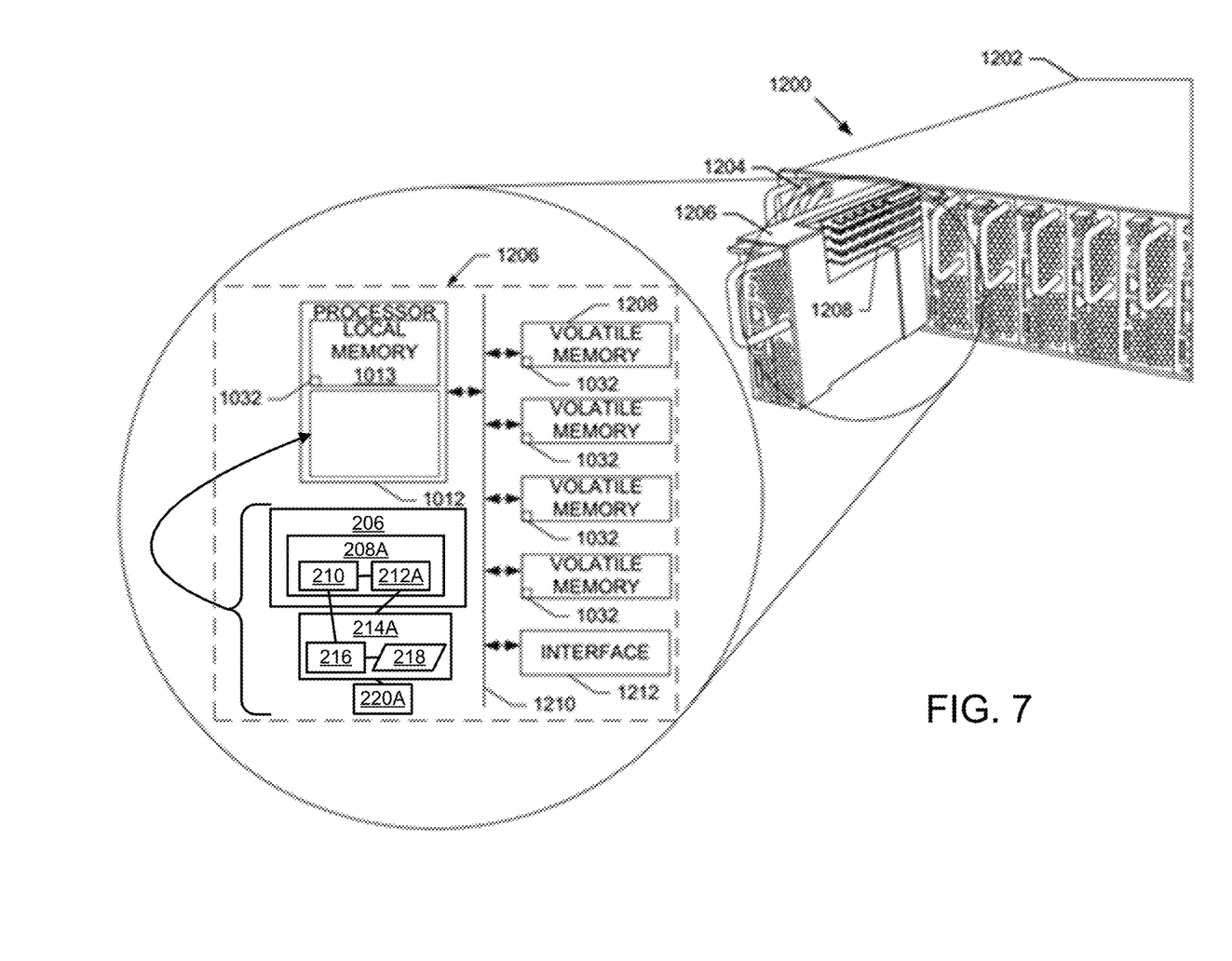
FIG. 7 is a schematic diagram of another computing device that may implement various methods of controlling memory footprints in accordance with an embodiment of the present disclosure.

FIG. 7 illustrates another computing device that can be used to implement various components described herein. More specifically, FIG. 7 illustrates an example system 1200 capable of implementing the host operating system 206, the virtual machine 208A, the VM memory 210, the virtual processor 212A, the guest operating system 214A, the memory manager 216, the memory slice table 218, and the applications 220A, as illustrated in FIG. 2. Alternatively or additionally, a hardware implementation (e.g., via an analog and/or logic circuit) of any or all of the components illustrated in FIG. 2 and listed above may be employed in the example system 1200.

In some embodiments illustrated by FIG. 7, the system 1200 is a rackmount server. Alternatively, the system 1200 can be any other type of computing device or system. The system 1200 of the illustrated example includes a chassis 1202, which includes removably attached power supplies 1204 and removably attached servers 1206. As shown in FIG. 7, the power supplies are distinct and separate from the attached servers 1206, with each power supply coupled to multiple attached servers 1206 to provide power thereto. In the illustrated example, the servers 1206 include a processor 1012 and memory 1013 local to the processor 1012. The processors 1012 may be any of a variety of commercially available processors, multiprocessors, microprocessors, or controllers known in the art. Similarly, the memory 1013 may be any of a variety of commercially available volatile and/or non-volatile (i.e., non-transitory or non-transient) data storage that is readable and/or writeable by, at least, the processor local to the memory. It is appreciated that the attached servers 1206 may incorporate additional processors and memory similar to or the same as the processor 1012 and the memory 1013.

The processor 1012 of the illustrated example is in communication with volatile memory 1208 via a bus 1210. In the illustrated example, the processor 1012 implements the host operating system 206, the virtual machine 208A, the VM memory 210, the virtual processor 212A, the guest operating system 214A, the memory manager 216, the memory slice table 218, and the applications 220A. The volatile memory 1208 may be implemented by Synchronous Dynamic Random Access Memory (SDRAM), Dynamic Random Access Memory (DRAM), RAMBUS Dynamic Random Access Memory (RDRAM) and/or any other type of random access memory device. Access to the volatile memory 1208 is controlled by a memory controller.

The servers 1206 of the illustrated example also include an example interface circuit 1212. The example interface circuit 1212 may be implemented by any type of interface standard, such as an Ethernet interface, an optical interface, a universal serial bus (USB), and/or a PCI express interface. Each of the example servers 1206 may be communicatively coupled to other computing devices or systems via the interface circuit 1212. These other computing devices or systems may be located within the same chassis 1202, within a different chassis in the same rack, or within a different chassis in a different rack.

In some examples, coded instructions 1032 stored in the local memory 1013 and/or in the volatile memory 1208 as shown in FIG. 7 may be provided to implement the example process of FIGS. 3 and 5 or other processes and components described herein. Additionally or alternatively, the servers 1206 may include additional components such as the non-volatile memory, the input devices, the output devices, mass storage devices, and/or other computing resources. It is appreciated that any mass storage devices coupled to the servers 1206 may be disposed distinctly and remote from the remainder of the server hardware.

Further Example Embodiments

The following examples pertain to further embodiments, from which numerous permutations and configurations will be apparent.

Example 1 is a computing device comprising a memory and at least one processor coupled to the memory. The at least one processor is configured to allocate at least a portion of the memory for use as virtual machine (VM) memory; partition the VM memory into a plurality of memory slices; associate each memory slice of the plurality of memory slices with a cost; receive a memory allocation request; identify at least one memory slice of the plurality of memory slices based on at least one cost associated with the at least one memory slice; allocate space sufficient to satisfy the memory allocation request within the at least one memory slice; and respond to the memory allocation request with an identifier of the space.

Example 2 includes the subject matter of Example 1, wherein the at least one processor is configured to identify the at least one memory slice at least in part by comparing the at least one cost associated with the at least one memory slice to at least one other cost associated with at least one other memory slice of the plurality of memory slices and determining that the at least one cost is less than the at least one other cost.

Example 3 includes the subject matter of either Example 1 or Example 2, wherein each memory slice of the plurality of memory slices has a uniform size.

Example 4 includes the subject matter of any of Examples 1 through 3, wherein at least one memory slice of the plurality of memory slices has a size different from another memory slice of the plurality of memory slices.

Example 5 includes the subject matter of any of Examples 1 through 4, wherein the at least one processor is further configured implement a virtual machine comprising at least one virtual processor and the VM memory.

Example 6 includes the subject matter of Example 5, wherein the at least one virtual processor is configured to implement a guest operating system including a memory manager.

Example 7 includes the subject matter of Example 6, wherein the at least one processor is configured to partition the VM memory at least in part by executing the memory manager.

Example 8 is a method of controlling a memory footprint of a virtual machine. The method comprises allocating at least a portion of a memory for use as virtual machine (VM) memory; partitioning the VM memory into a plurality of memory slices; associating each memory slice of the plurality of memory slices with a cost; receiving a memory allocation request; identifying at least one memory slice of the plurality of memory slices based on at least one cost associated with the at least one memory slice; allocating space sufficient to satisfy the memory allocation request within the at least one memory slice; and responding to the memory allocation request with an identifier of the space.

Example 9 includes the subject matter of Example 8, wherein identifying the at least one memory slice at least comprises comparing the at least one cost associated with the at least one memory slice to at least one other cost associated with at least one other memory slice of the plurality of memory slices; and determining that the at least one cost is less than the at least one other cost.

Example 10 includes the subject matter of either Example 8 or Example 9, wherein partitioning the VM memory comprises partitioning each memory slice of the plurality of memory slices to have a uniform size.

Example 11 includes the subject matter of any of Examples 8 through 10, wherein partitioning the VM memory comprises partitioning one memory slice of the plurality of memory slices to have a size different from another memory slice of the plurality of memory slices.

Example 12 includes the subject matter of any of Examples 8 through 11, further comprising implementing a virtual machine comprising at least one virtual processor and the VM memory.

Example 13 includes the subject matter of Example 12, wherein implementing the virtual machine comprises configuring the at least one virtual processor to implement a guest operating system including a memory manager.

Example 14 includes the subject matter of Example 13, wherein partitioning the VM memory comprises executing, by the at least one virtual processor, the memory manager.

Example 15 is a non-transient computer readable medium encoded with instructions that when executed by one or more processors cause a process for controlling a memory footprint for a virtual machine to be carried out. The process comprises allocating at least a portion of a memory for use as virtual machine (VM) memory; partitioning the VM memory into a plurality of memory slices; associating each memory slice of the plurality of memory slices with a cost; receiving a memory allocation request; identifying at least one memory slice of the plurality of memory slices based on at least one cost associated with the at least one memory slice; allocating space sufficient to satisfy the memory allocation request within the at least one memory slice; and responding to the memory allocation request with an identifier of the space.

Example 16 includes the subject matter of Example 15, wherein identifying the at least one memory slice at least comprises comparing the at least one cost associated with the at least one memory slice to at least one other cost associated with at least one other memory slice of the plurality of memory slices; and determining that the at least one cost is less than the at least one other cost.

Example 17 includes the subject matter of either Example 15 or Example 16, wherein partitioning the VM memory comprises partitioning each memory slice of the plurality of memory slices to have a uniform size.

Example 18 includes the subject matter of any of Examples 15 through 17, wherein partitioning the VM memory comprises partitioning one memory slice of the plurality of memory slices to have a size different from another memory slice of the plurality of memory slices.

Example 19 includes the subject matter of any of Examples 15 through 18, wherein the process further comprises implementing a virtual machine comprising at least one virtual processor and the VM memory.

Example 20 includes the subject matter of Example 19, wherein implementing the virtual machine comprises configuring the at least one virtual processor to implement a guest operating system including a memory manager.

Example 21 includes the subject matter of Example 20, wherein partitioning the VM memory comprises executing, by the at least one virtual processor, the memory manager.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A computing device comprising:
a physical memory; and
at least one processor coupled to the physical memory and configured to:
allocate at least one portion of the physical memory for use by a virtual machine (VM);
partition the at least one portion of the physical memory into a plurality of memory slices associated with the VM;
associate each memory slice of the plurality of memory slices with an artificial cost to access the physical memory within the memory slice;
receive a memory allocation request;
identify at least one memory slice of the plurality of memory slices based on the artificial cost to access the physical memory within the at least one memory slice;
allocate space within the at least one memory slice that is sufficient to satisfy the memory allocation request; and
respond to the memory allocation request with an identifier of the space.

2. The computing device of claim 1, wherein the at least one processor is configured to identify the at least one memory slice at least in part by comparing the artificial cost associated with the at least one memory slice to at least one other artificial cost associated with at least one other memory slice of the plurality of memory slices and determining that the artificial cost is less than the at least one other artificial cost.

3. The computing device of claim 1, wherein each memory slice of the plurality of memory slices has a uniform size.

4. The computing device of claim 1, wherein at least one memory slice of the plurality of memory slices has a size different from another memory slice of the plurality of memory slices.

5. The computing device of claim 1, wherein the at least one processor is further configured implement a virtual machine comprising at least one virtual processor and the at least one portion of the physical memory.

6. The computing device of claim 5, wherein the at least one virtual processor is configured to implement a guest operating system including a memory manager.

7. The computing device of claim 6, wherein the at least one processor is configured to partition the at least one portion of the physical memory at least in part by executing the memory manager.

8. A method of controlling a physical memory footprint of a virtual machine, the method comprising:
allocating at least one portion of a physical memory for use by a virtual machine (VM);
partitioning the at least one portion of the physical memory into a plurality of memory slices associated with the VM;
associating each memory slice of the plurality of memory slices with an artificial cost to access the physical memory within the memory slice;
receiving a memory allocation request;
identifying at least one memory slice of the plurality of memory slices based on the artificial cost to access the physical memory within the at least one memory slice;
allocating space within the at least one memory slice that is sufficient to satisfy the memory allocation request; and
responding to the memory allocation request with an identifier of the space.

9. The method of claim 8, wherein identifying the at least one memory slice at least comprises:
comparing the artificial cost associated with the at least one memory slice to at least one other artificial cost associated with at least one other memory slice of the plurality of memory slices; and
determining that the artificial cost is less than the at least one other artificial cost.

10. The method of claim 8, wherein partitioning the at least one portion of the physical memory comprises partitioning each memory slice of the plurality of memory slices to have a uniform size.

11. The method of claim 8, wherein partitioning the at least one portion of the physical memory comprises partitioning one memory slice of the plurality of memory slices to have a size different from another memory slice of the plurality of memory slices.

12. The method of claim 8, further comprising implementing a virtual machine comprising at least one virtual processor and the at least one portion of the physical memory.

13. The method of claim 12, wherein implementing the virtual machine comprises configuring the at least one virtual processor to implement a guest operating system including a memory manager.

14. The method of claim 13, wherein partitioning the at least one portion of the physical memory comprises executing, by the at least one virtual processor, the memory manager.

15. A non-transitory computer readable medium encoded with instructions that when executed by one or more processors cause a process for controlling a physical memory footprint for a virtual machine to be carried out, the process comprising:
 allocating at least one portion of a physical memory for use by a virtual machine (VM);
 partitioning the at least one portion of the physical memory into a plurality of memory slices associated with the VM;
 associating each memory slice of the plurality of memory slices with an artificial cost to access the physical memory within the memory slice;
 receiving a memory allocation request;
 identifying at least one memory slice of the plurality of memory slices based on the artificial cost to access the physical memory within the at least one memory slice;
 allocating space within the at least one memory slice that is sufficient to satisfy the memory allocation request; and
 responding to the memory allocation request with an identifier of the space.

16. The non-transitory computer readable medium of claim 15, wherein identifying the at least one memory slice at least comprises:
 comparing the artificial cost associated with the at least one memory slice to at least one other artificial cost associated with at least one other memory slice of the plurality of memory slices; and
 determining that the artificial cost is less than the at least one other artificial cost.

17. The non-transitory computer readable medium of claim 15, wherein partitioning the at least one portion of the physical memory comprises partitioning each memory slice of the plurality of memory slices to have a uniform size.

18. The non-transitory computer readable medium of claim 15, wherein partitioning the at least one portion of the physical memory comprises partitioning one memory slice of the plurality of memory slices to have a size different from another memory slice of the plurality of memory slices.

19. The non-transitory computer readable medium of claim 15, wherein the process further comprises implementing a virtual machine comprising at least one virtual processor and the at least one portion of the physical memory.

20. The non-transitory computer readable medium of claim 19, wherein implementing the virtual machine comprises configuring the at least one virtual processor to implement a guest operating system including a memory manager.

21. The non-transitory computer readable medium of claim 20, wherein partitioning the at least one portion of the physical memory comprises executing, by the at least one virtual processor, the memory manager.

* * * * *